UNITED STATES PATENT OFFICE.

JOHN W. BARNES, OF CHESTER, PENNSYLVANIA, ASSIGNOR TO HENRY W. MORROW, OF WILMINGTON, DELAWARE.

METHOD OF TREATING PARCHMENTIZED-FIBER WASTE.

SPECIFICATION forming part of Letters Patent No. 441,462, dated November 25, 1890.

Application filed March 24, 1890. Serial No. 345,128. (Specimens.)

*To all whom it may concern:*

Be it known that I, JOHN W. BARNES, a citizen of the United States, and a resident of Chester, Delaware county, Pennsylvania, have invented a Method of Treating Parchmentized-Fiber Waste, of which the following is a specification.

The object of my invention is to utilize the scrap or waste resulting in the manufacture of parchmentized fiber or in the making of articles from such material, and this object I attain in the manner hereinafter set forth.

By "parchmentized fiber" is meant vegetable fibrous material the cellulose in which has been subjected to the action of a chemical solution which has a converting or pectising effect on said cellulose, so that when sheets of the material are superposed and subjected to pressure they will firmly adhere and a hard and tough laminated product will result. The material so treated is known to the trade under various names, such as "vulcanized fiber," "parchment paper," "leatheroid," "kartavert," &c.

In the manufacture of parchmentized fiber or of articles from such material there is always a large amount of waste, due either to varying and uncertain action of the chemicals used in treating the paper or because of the scraps or cuttings resulting from the manufacture of various articles for which the material is now used. In utilizing this waste I subject it to the action of an agent which will soften the pectised surfaces of the laminæ composing the waste and thus permit of the removal or discharge of the pectised matter so softened, so that the waste is reduced to the condition of separated or uncemented laminæ with unpectised surfaces, and hence is in condition for being again reduced to pulp. The preferable agent for the purpose is an alkaline solution—such as a solution of potash or soda—which I find has the effect of thus softening the pectised surfaces of the laminæ without injuring the fibrous bodies of the latter, so that when the waste is washed the uncemented laminæ can be readily separated and reduced to pulp by rubbing or friction—as, for instance, in an ordinary pulping-engine. The length of time during which the fiber is subjected to the treatment depends upon the strength of the alkaline solution, the rule being that the stronger the solution the less the time required for treatment, and the solution may, if desired, be heated during the treatment.

The process can be applied either to fibers from which the converting chemical has been removed or to fibers in which this chemical is still present, the presence of the converting chemical in the fiber facilitating the process.

Before being subjected to the treatment the waste may be softened by soaking it in water or some chemical solution; but this is not necessary.

Owing to the tough and gummy nature of parchmentized fiber all attempts to utilize the waste so as to obtain a fibrous product have heretofore proved futile, the only attempt to utilize the waste with which I am familiar being a plan which has been proposed of simply grinding the waste to a fine powder, thus destroying its fibrous nature and strength.

It will be evident that waste treated in accordance with my invention and retaining its fibrous character is available for a much wider range of uses than waste reduced to powdered form, as in accordance with the process above referred to.

Although in carrying out my invention it is, as before stated, preferable to use an alkaline solution, other agents which have a softening effect upon the pectised surfaces of the laminæ of the waste without exerting any injurious influence upon the fibers themselves may be employed. As instances of such other agents I may mention solutions of sulphuric acid, chloride of zinc, &c., of so weak a character that while they will have the desired softening effect upon the already pectised surfaces of the laminæ they will not pectise or injure the cellulose of the fibrous bodies of said laminæ.

Having thus described my invention, I claim and desire to secure by Letters Patent—

1. The mode herein described of treating parchmentized-fiber waste, said mode consisting in releasing from each other the laminæ composing the waste by subjecting said waste to the action of an agent which will soften the pectised surfaces of said laminæ and thus permit the removal of the matter so softened, substantially as specified.

2. The mode herein described of treating parchmentized-fiber waste, said mode consisting in releasing from each other the laminæ composing the waste by subjecting said waste to the action of an alkaline solution, whereby the pectised surfaces of the laminæ are softened and the removal of said softened matter permitted, substantially as specified.

3. The mode herein described of treating parchmentized-fiber waste, said mode consisting in releasing from each other the laminæ composing the waste by subjecting said waste first to the action of an agent which will soften the pectised surfaces of said laminæ and then to rubbing or friction, substantially as specified.

In testimony whereof I have signed my name to this specification in the presence of two subscribing witnesses.

JOHN W. BARNES.

Witnesses:
CÆSAR RODNEY MAY,
J. M. ALLEN.